United States Patent
Kolhouse et al.

(10) Patent No.: US 9,182,764 B1
(45) Date of Patent: Nov. 10, 2015

(54) APPARATUS AND METHOD FOR GROUPING VEHICLES FOR COOPERATIVE DRIVING

(71) Applicant: Cummins, Inc., Columbus, IN (US)

(72) Inventors: Steven J. Kolhouse, Columbus, IN (US); Carlos A. Lana, Columbus, IN (US); Vivek A. Sujan, Columbus, IN (US); Phani Vajapeyazula, Columbus, IN (US); J. Stephen Wills, Columbus, IN (US); Thomas M. Yonushonis, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 14/450,926

(22) Filed: Aug. 4, 2014

(51) Int. Cl.
*G06F 19/00* (2011.01)
*G05D 1/02* (2006.01)
*G01C 21/34* (2006.01)
*G08G 1/00* (2006.01)

(52) U.S. Cl.
CPC .......... *G05D 1/0293* (2013.01); *G01C 21/3469* (2013.01); *G08G 1/22* (2013.01)

(58) Field of Classification Search
CPC ........ B62D 12/02; B62D 1/28; G05D 1/0265; G05D 1/0295; G05D 2201/0213
USPC ............. 701/29.3, 25, 96, 117, 301; 180/167; 244/49, 50
See application file for complete search history.

(56) References Cited

U.S. PATENT DOCUMENTS

| | | | | |
|---|---|---|---|---|
| 5,295,551 | A * | 3/1994 | Sukonick | 180/167 |
| 5,896,554 | A * | 4/1999 | Itoh | 455/2.01 |
| 6,711,495 | B1 * | 3/2004 | Ukai et al. | 701/29.3 |
| 6,823,258 | B2 * | 11/2004 | Ukai et al. | 705/4 |
| 7,489,993 | B2 * | 2/2009 | Coffee et al. | 701/32.3 |
| 8,014,928 | B2 | 9/2011 | Mills et al. | |
| 8,100,426 | B2 | 1/2012 | Kronenberg | |
| 8,180,297 | B2 | 5/2012 | Hesse et al. | |
| 8,977,489 | B2 * | 3/2015 | Szczerba et al. | 701/428 |
| 2009/0195655 | A1 * | 8/2009 | Pandey | 348/158 |
| 2010/0256836 | A1 | 10/2010 | Mudalige | |
| 2010/0299044 | A1 | 11/2010 | Miyake et al. | |
| 2011/0130905 | A1 * | 6/2011 | Mayer | 701/22 |
| 2011/0270520 | A1 | 11/2011 | Kronenberg | |

(Continued)

OTHER PUBLICATIONS

Lee et al., The implementation of the intelligent transport system for the real-time roadside environment information transfer, 2011, IEEE, p. p. 76-81.*

(Continued)

*Primary Examiner* — McDieunel Marc
(74) *Attorney, Agent, or Firm* — Foley & Lardner LLP

(57) ABSTRACT

An apparatus includes a logistics manager that includes a processor. The logistics manager is communicably coupled to at least one of a first wireless communication module onboard a first vehicle and a second wireless communication module onboard a second vehicle. The logistics manager is configured to: receive, via the first wireless communication module, first data regarding the first vehicle, where the first data is provided by a first sensor module onboard the first vehicle; receive, via the second wireless communication module, second data regarding the second vehicle, where the second data is provided by a second sensor module onboard the second vehicle; and provide navigational commands to at least one of the first vehicle and the second vehicle based on a cost and benefit analysis in response to at least one the first data and the second data.

11 Claims, 8 Drawing Sheets

(56) References Cited

U.S. PATENT DOCUMENTS

| | | | |
|---|---|---|---|
| 2014/0121953 A1* | 5/2014 | Kraeling et al. | 701/117 |
| 2014/0197281 A1* | 7/2014 | Kraeling et al. | 246/1 R |
| 2014/0236449 A1* | 8/2014 | Horn | 701/96 |
| 2014/0309836 A1* | 10/2014 | Ollis | 701/25 |
| 2015/0025917 A1* | 1/2015 | Stempora | 705/4 |

OTHER PUBLICATIONS

Guo et al., Hierarchical platoon control with heterogeneous information feedback, 2011, IEEE, p. 1766-1781.*

* cited by examiner

APPARATUS AND METHOD FOR GROUPING VEHICLES FOR COOPERATIVE DRIVING

BACKGROUND

Fuel efficiency has traditionally been an important performance criterion for vehicles. As gas prices continue to rise and emissions regulations grow more stringent, vehicular fuel efficiency become even more critical. The transportation industry is particularly cognizant of this criterion due to the correlation between fuel efficiency and a company's bottom line. This is particularly true with respect to the trucking industry.

According to the U.S. Department of Energy (DOE), Class 8 trucks haul approximately 69% of all freight tonnage and use more than 20% of the fuel consumed in the United States. Trucks having a gross vehicle weight rating (GVWR) above 33,000 pounds qualify as Class 8. Hence, there is a need to reduce the fuel consumption of trucks, and particularly of large, long haul trucks.

In 2020, the Department of Energy (DOE) initiated a 'SuperTruck' program to challenge engine and vehicle manufacturers to create a 50% more efficient Class 8 truck. The goal of this five-year program is to design a heavy-duty Class 8 truck which demonstrates a 50% improvement in overall freight efficiency measured in ton-miles per gallon. To ensure there is total vehicle improvement, 30% of the efficiency must come from the tractor and trailer, while the remaining 20% must come from the engine. Each vehicle's engine also needs to show 50% brake thermal efficiency, and a path to achieve 55% brake thermal efficiency must be provided. Conventional approaches to achieving such efficiencies typically include improving engine performance, reducing vehicular weight, and reducing aerodynamic drag.

SUMMARY OF THE INVENTION

Disclosed herein are methods, systems, and computer-readable media for grouping vehicles for cooperative driving. Such grouped vehicles can provide cooperative sharing of an aerodynamic load.

One embodiment relates to an apparatus that comprises a logistics manager. The logistics manager includes a processor and is communicably coupled to at least one of a first wireless communication module onboard a first vehicle and a second wireless communication module onboard a second vehicle. The logistics manager is configured to: receive, via the first wireless communication module, first data regarding the first vehicle, where the first data is provided by a first sensor module onboard the first vehicle; receive, via the second wireless communication module, second data regarding the second vehicle, where the second data is provided by a second sensor module onboard the second vehicle; and provide navigational commands to at least one of the first vehicle and the second vehicle based on a cost and benefit analysis in response to at least one the first data and the second data.

Another embodiment relates to a system for effecting a cooperative sharing of an aerodynamic load between a first vehicle and a second vehicle comprising: a first sensor module onboard the first vehicle for providing first data regarding the first vehicle; a second sensor module onboard the second vehicle for providing second data regarding the second vehicle; a first wireless communication module onboard the first vehicle; a second wireless communication module onboard the second vehicle; and a logistics manager communicably coupled, via a third wireless communication module, to the first wireless communication module and the second wireless communication module, wherein the logistics manager is configured to provide navigational commands to at least one of the first vehicle and the second vehicle based on a cost and benefit analysis in response to at least one of the first data and the second data.

One embodiment relates to a method for cooperative sharing of an aerodynamic load between a first vehicle and a second vehicle, comprising: analyzing, by a processing device, at least one of proximity data, current direction data, size data, type data, power data, weight data, destination data, and preference policies to identify the first vehicle as a host vehicle to be drafted by the second vehicle via a slipstream generated by the host vehicle; and controlling the second vehicle into a tandem position with the first vehicle to effect a drafting of the first vehicle by the second vehicle, wherein the second vehicle is positioned within in the slipstream generated by the host vehicle.

Another embodiment relates to an apparatus comprising: an initial planning module configured to interpret one or more fleet delivery requirements, assets, drivers, and vehicle descriptions; a tandem implementation module responsive to input from the initial planning module, wherein the tandem implementation module is configured to determine a travel schedule with respect to a first vehicle and a second vehicle that enables the first vehicle and the second vehicle to travel in tandem for a least a portion of a route; and a scheduler module configured to provide a fleet delivery schedule to the first vehicle and the second vehicle in response to the tandem implementation module.

Another embodiment relates to a method for cooperative sharing of an aerodynamic load between across a fleet of vehicles, comprising: inputting vehicles, drivers, and load information; determining, using a processor, schedules for optimizing tandem utilization; and controlling the vehicles in tandem positions to effect a drafting of a first vehicle by a second vehicle in the slipstream of the first vehicle in accordance with the determined schedules.

The vehicle information may comprise power/weight, loading limits, current fuel, fuel capacity, fuel economy, upcoming/required maintenance, operational constraints, reliability/breakdown statistics, current location, nominal schedule/start-time, flexibility to schedule/start-time, and/or current load(s) on a vehicle. The driver information may comprise driver hours utilized/remaining, driver fuel economy performance, driver preferences, and/or driver risk profile. The load information may comprise loading weight, loading volume, pickup, destination, flexibility state (specific vehicle required, already loaded, etc.), load special requirements, and/or delivery time.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings

DETAILED DESCRIPTION

Figure 1:
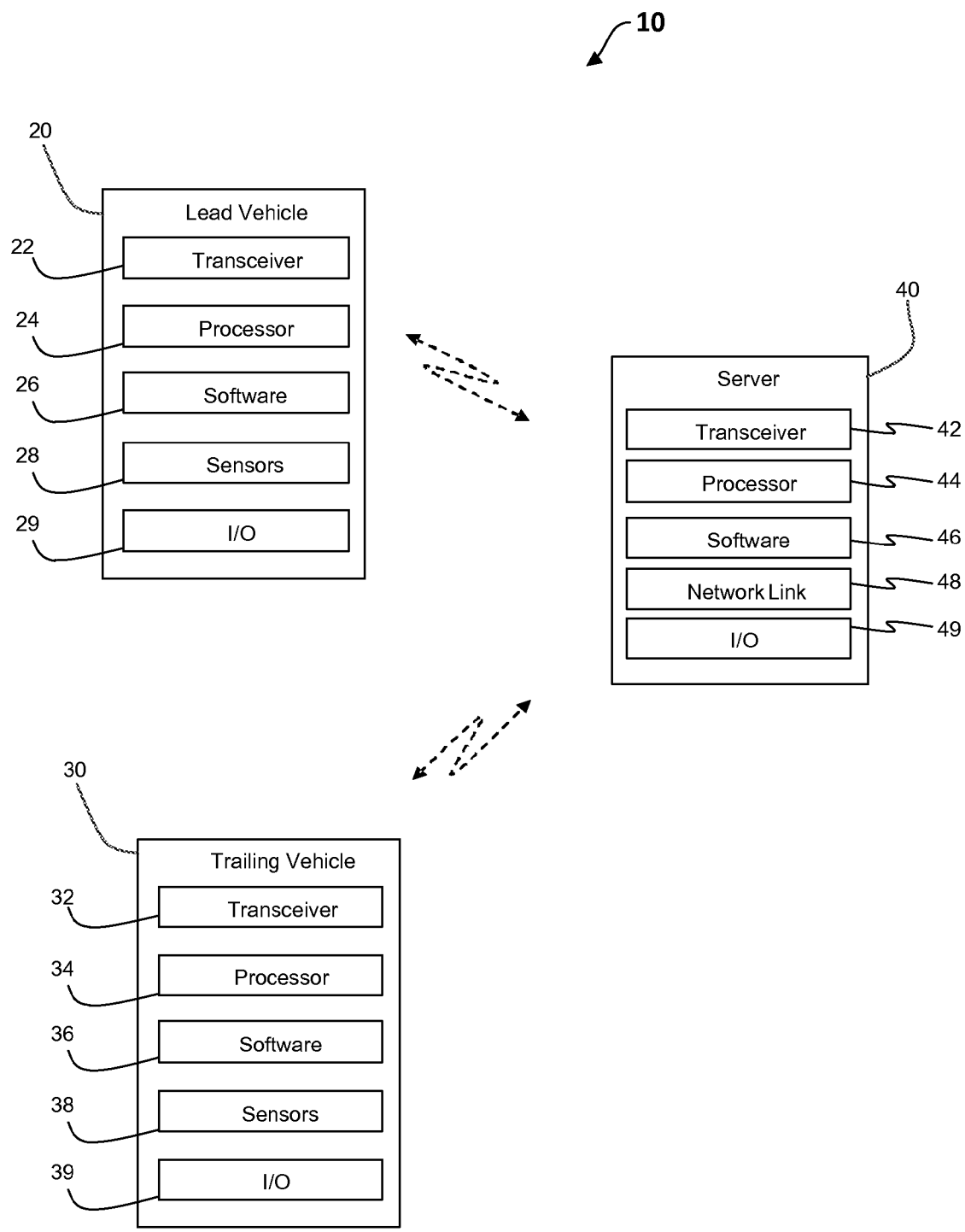
FIG. 1 is a diagram of component modules employed in two vehicles in a tandem driving formation in accordance with the illustrative embodiments of the teachings of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure relates generally to a system and method for implementing low cost drafting of vehicles traveling on a road at speeds in the aerodynamic losses regime.

As noted above, a need remains in the art for a system or method for coordinating the movement of vehicles to optimize the cost and/or performance of key functions and parameters thereof with respect to a host vehicle or a fleet of vehicles.

The present disclosure addresses this need by providing systems, method, and computer-readable media for implementing low cost drafting of vehicles traveling on a road at speeds in the aerodynamic losses regime. The system is adapted to better utilize low-cost spaces on the road for individual, cooperative and fleet level implementations. The system can determine if a low-cost travel opportunity exists and can implement a schedule to utilize the low-cost travel opportunity based upon preferred features.

Many configurations of the present teachings are discussed herein, including: 1) a network (e.g., web) based embodiment that effects a cooperative grouping of vehicles based on 'opting in' and analysis of various factors, including cost functions, preferences, schedules, etc. 2) a fleet based embodiment that implements a preplanning of groups and routes based on certain factors, including cost functions and/or rules based determinations.

FIG. 1 is a diagram of component modules that may be employed by two vehicles in a tandem driving formation, in accordance with an embodiment. Such a tandem driving formation may be formed by a first vehicle providing a slipstream in which a second vehicle can drive. In generally a slipstream refers to a region behind a moving object (e.g., the first vehicle) in which a wake of fluid (e.g., air) is moving at a comparable velocity to the moving object, relative to the fluid (e.g., air) through which the object is moving. The term slipstream may also refer to the similar region adjacent to an object with a fluid moving around it. The term "slipstreaming" may describe an object (e.g., the second vehicle) traveling inside the slipstream of another object (e.g., the first vehicle). In this configuration, when the second vehicle is inside the slipstream of the first vehicle, the second vehicle will require less power to maintain its speed than if it were moving independently. It should be understood that some tandem slipstreaming configurations may include more than two vehicles. System 10 can distributed over a lead vehicle system 20, a trailing vehicle system 30 and a central computing system or server 40. The lead and trailing vehicles each include a transceiver module 22, a processor module 24, a software module 26, a sensor module 28, and an input/output interface module 29. The trailing vehicle 30 includes a transceiver module 32, a processor module 34, a software module 36, a sensor module 38, and an input/output interface module 39. The transceiver modules may communicate with each other and with a server 40 via a server transceiver module 42. As such, these modules comprise a wireless private local area network. In addition, the vehicles 20 and 30 communicate with a public network such as the Internet via a network link 48 in the server system 40. Hence, the network within which the system 10 operates may be a private network, e.g., Wi-Fi or WAN, or a public network such as the Internet, cellular network, radio network, etc. The processor modules may include one or more processing device, and may be implemented as a general-purpose processor, an application specific integrated circuit (ASIC), one or more field programmable gate arrays (FPGAs), a digital-signal-processor (DSP), a group of processing components, other suitable electronic processing components, and any commercially available processor. In one embodiment, processors 24 and 34 are implemented by an embedded electronic control unit (ECU) of a vehicle (e.g., vehicle 20, vehicle 30, etc.).

The above modules, coupled with the processor module 44, software module 46, network link 48 and input/output interface module 49 of the server, operate in response to programs that may be stored in software 26, 36 and 46 that can implement tandem driving procedures. Such software 26, 36, and 46 may include a memory. The memory may be one or more devices (e.g., RAM, ROM, flash memory, hard disk storage, etc.) for storing data and/or computer code for facilitating the various processes described herein. The memory may be or include non-transient volatile memory or non-volatile memory. The memory may include database components, object code components, script components, or any other type of information structure for supporting the various activities and information structures described herein. The memory may be communicably connected to the processor modules 24, 34, and 44, and may include computer code or instructions for executing the processes described herein. The transceivers 22, 32, and 42 may include one or more devices configured to transmit and receive data signals. In one embodiment, the onboard transceivers can be implemented with an OEM solution such as OnStar™.

In some embodiments, velocity and position data may be utilized in implemented the techniques disclosed herein.

Such velocity and position data may be provided by Global Positioning Systems (GPS) sensors (e.g., sensors 28 and 38), provided by the engines, (e.g., via a standard SAE protocol, via an ECU, or provided by a network, etc.).

The systems described above including the transceivers 22, 32; processors 24, 34; software 26, 36; sensors 28, 38 and input/output interface 29, 39 may also be implemented with a mobile device, such as a smartphone, tablet, portable computer and the like as will be appreciated by those skilled in the art. For example, the transceivers may be transceivers of a mobile device, the processor may be the mobile device processor, the software may include applications and/or operating systems of the mobile device, the sensors may include sensors or the mobile device (e.g., motion sensors, GPS sensors, etc.), and the input/pout interfaces may include ports and/or other connections of the mobile device. It should be understood, that embodiments of the present invention may implemented with some or all of the modules shown in FIG. 1.

Figure 2:
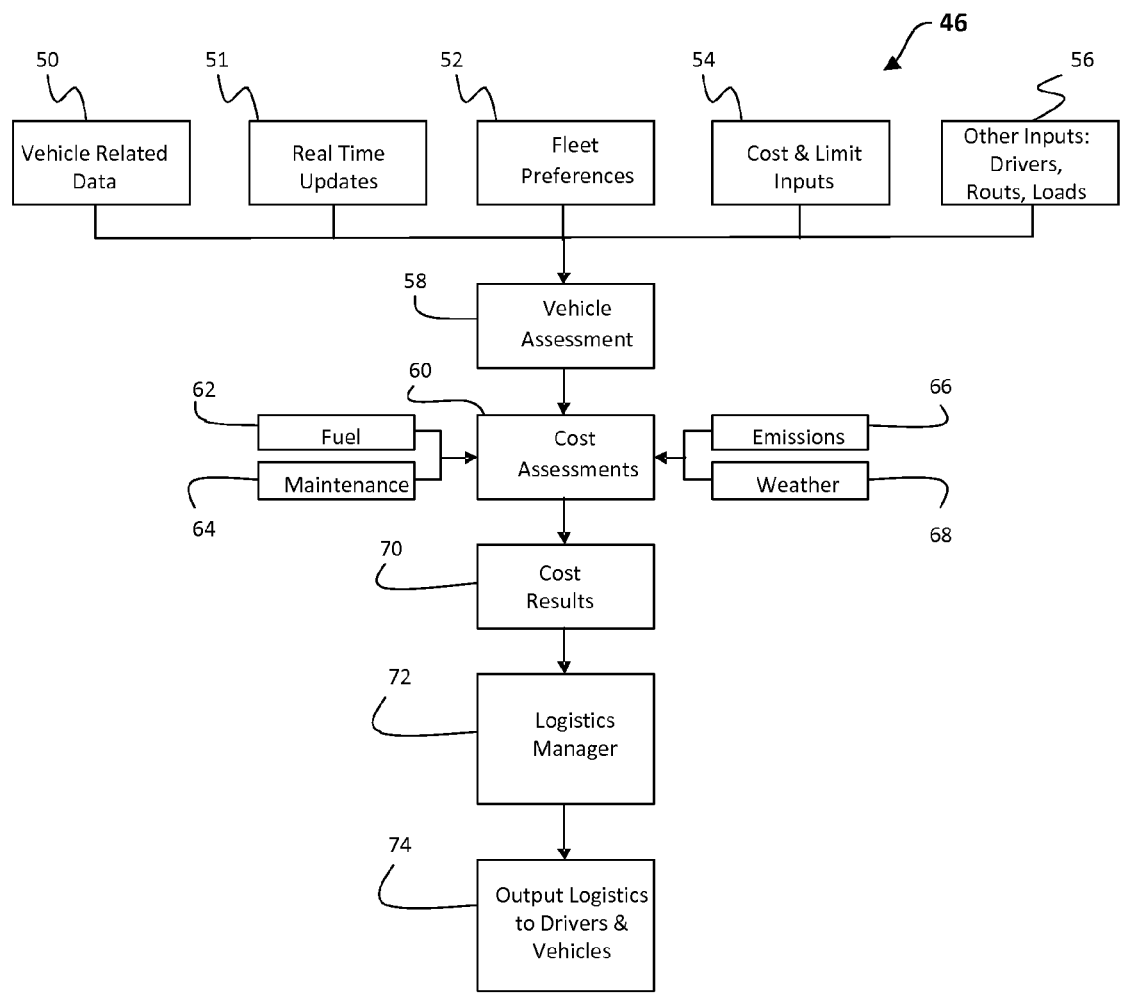
FIG. 2 is a block diagram of a central computing system used in FIG. 1 for implementing the methods of the present invention.

FIG. 2 is a block diagram of an embodiment of software module 46 of FIG. 1. The server side software module 46 may receive vehicle related data 50, real time updates 51, fleet preferences 52, cost and limit inputs 54, and/or other inputs including drivers, routes and loads 56. A vehicle assessment 58 can be performed and cost assessments 60 are determined with respect to a number of operator defined costs. For example, such costs may include fuel costs 62, maintenance interval costs 64, emissions 66, and weather related costs 68, etc. Costs can also be in terms of maintenance, driver satisfaction, risk, fuel, CO2 emissions, time of deliveries, increase/decrease of an uncertainty factor, etc. The results 70 of the cost assessments are output to a logistics manager 72. The logistics manager 72 outputs tandem driving route and schedule commands 74 to drivers and vehicles.

Figure 3A:
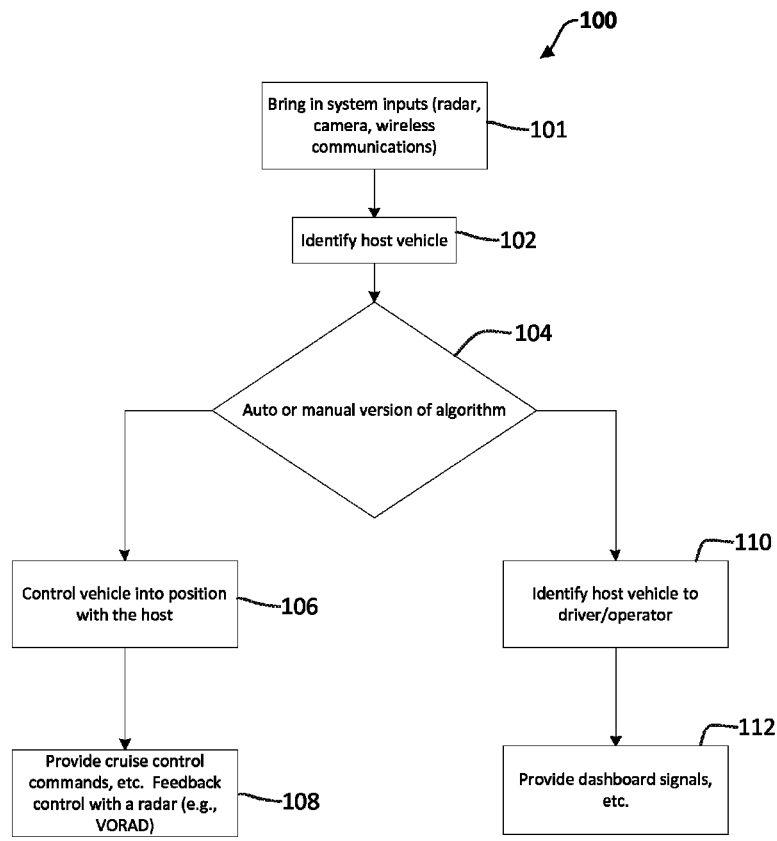
FIG. 3a is a flow diagram of a "parasitic" embodiment of the invention.

FIG. 3a is a flow diagram of an embodiment of the invention. This embodiment is may be described as "parasitic" as it does not require cooperation of the host (i.e. a host vehicle that is in communication with the vehicle employing this embodiment. In other words, process 100 is a standalone version that does not require communication or cooperation with a partner vehicle. In step 101, system inputs can be provided via smartphone, tablet, embedded electronics, a radar system, radio receiver (e.g., Global Positioning System), camera, or other suitable sensor via a wireless communications link. For example, the inputs may provide the host vehicle's speed, identifying information, presence of placards and information related to the host, license plate information, background checks based on any available information, the host vehicle's type/size, an estimate of vehicle destination, etc.

Figure 3B:
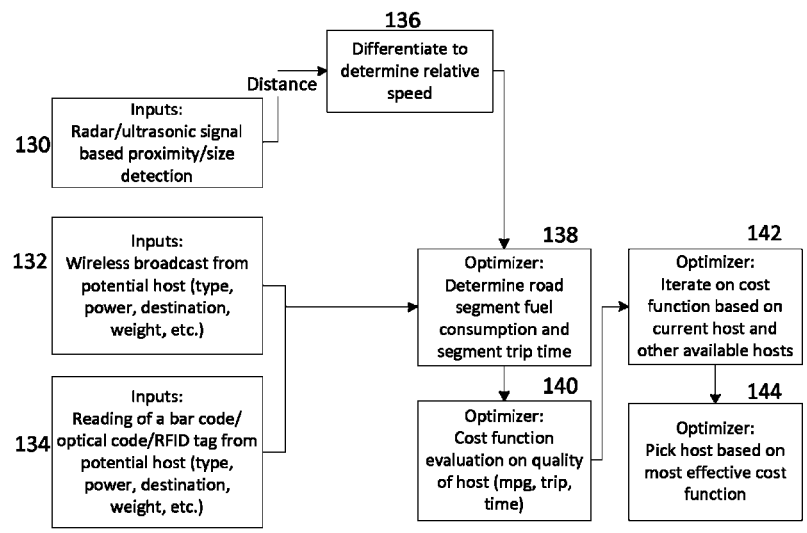
FIG. 3b is a flow diagram of an algorithm that may be used to identify a host vehicle, according to an embodiment of the invention.

At step 102 the host vehicle is identified. The host vehicle may be identified using a number of algorithms, including the following:

1) An algorithm as depicted in FIG. 3b may be utilized. Such an algorithm is based on proximity, direction, time, size of vehicle, type of vehicle, power/weight similarity, etc. For example, a vehicle may follow a truck having indicia of a certain size—trailer, bobtail, etc., which can be determined, e.g., by radar. Various inputs may be provided, including signals provided by radar/ultrasonic devices (130). Based on these signals, a relative speed of the host vehicle may be determined (136), which may be adjusted in real time based on updated separation distances (e.g., as determined from the signals). Other inputs may be received via a wireless broadcast from the potential host. For example, the host vehicle may transmit a vehicle type, power, destination, weight, etc. (132). Other inputs may include information that is determined based on a data provided by a camera. The camera data may be analyzed to detect an optical code that is located on the potential host vehicle. For example, this may include a bar code, a quick response (QR) code, and the like. In one embodiment, an RFID reader may be utilized to detect information from an RFID tag of the potential host vehicle. Based on the optical code or tag, a vehicle type, vehicle type, power, destination, weight, etc., may be determined. For example, the optical code or RFID tag may serve as an identifier or link used to access a database of vehicle records. As another example, the optical code or RFID tag may embed the information therein so that it may be directly accessed when the optical code or RFID tag is decoded or otherwise analyzed. After the inputs are received, various optimizers may be run over the inputs to determine the various cost benefits of selecting a particular host vehicle. For example, the road segment fuel consumption and segment trip time benefits may be analyzed (138). As another example, the quality of the prospective host may be evaluated (e.g., based on mpg, the remained of the trip, time, etc.) (140). As another example, the current potential host may be compared to other available hosts (142). Based on the determined costs and benefits, a host may be selected (144).

Figure 3C:
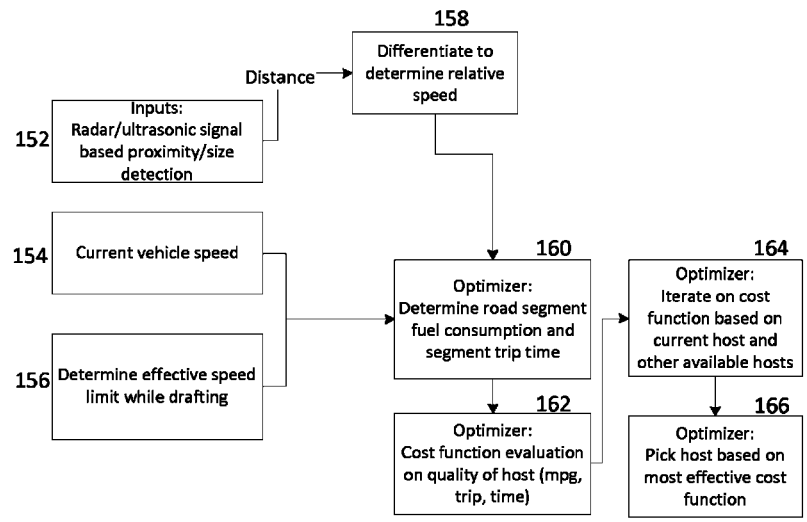
FIG. 3c is a flow diagram of an algorithm that may be used to identify a host vehicle, according to an embodiment of the invention.

2) An algorithm as depicted in FIG. 3c may be utilized. Such an algorithm is based on the speed of a potential host vehicle. The algorithm can be used to match a host vehicle having a desired and/or acceptable speed or braking distance. Various inputs may be provided, including signals provided by radar/ultrasonic devices (152) that may be based on proximity and/or size detection. Based on these signals, a relative speed of the host vehicle may be determined (158), which may be adjusted in real time based on updated separation distances (e.g., as determined from the signals). Other inputs may be received via a wireless broadcast from the potential host. For example, the host vehicle may transmit its speed (154) or an effective speed limit may be determined (locally or transmitted from the potentiation host) while drafting (156). After the inputs are received, various optimizers may be run over the inputs to determine the various cost benefits of selecting a particular host vehicle. For example, the road segment fuel consumption and segment trip time benefits may be analyzed (160). As another example, the quality of the prospective host may be evaluated (e.g., based on mpg, the remained of the trip, time, etc.) (162). As another example, the current potential host may be compared to other available hosts (164). Based on the determined costs and benefits, a host may be selected (166).

3) An algorithm based on the destination of the candidate host vehicles may be used. For example, a license plate of a potential host vehicle may be detected or provided by the host vehicle. Based on the license plate information, a destination of the potential host may be determined or estimated. In determining the destination, a database or remote resource may be accessed. Such a resource may provide routing information that may be accessed based on a license plate number.

Figure 3D:
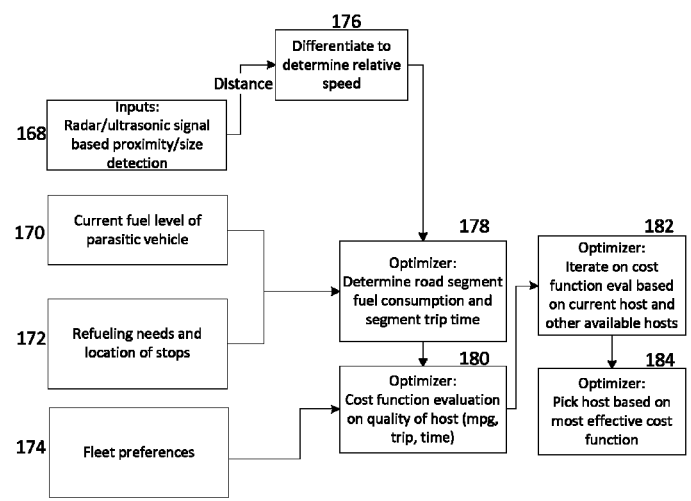
FIG. 3d is a flow diagram of an algorithm that may be used to identify a host vehicle, according to an embodiment of the invention.

4) An algorithm as depicted in FIG. 3d may be utilized. Such an algorithm may be based on fleet preferences/policies corresponding to a fleet of vehicles (e.g., fueling level policies, membership level policies, trip times, etc.) and recognition of route flexibility and/or adjustments in a cost/benefit relationship. Various inputs may be provided, including signals provided by radar/ultrasonic devices (168) that may be based on proximity and/or size detection. Based on these signals, a relative speed of the host vehicle may be determined (176), which may be adjusted in real time based on updated separation distances (e.g., as determined from the signals). Other inputs may be used. For example, the fuel level of the parasitic vehicle (i.e. the vehicle running this algorithm) may be analyzed (170). Additionally, refueling needs and locations of stops of the parasitic vehicle may be analyzed (172). Additionally, the host vehicle may transmit its fleet preferences or the parasitic vehicle may analyze its fleet preferences (174). After the inputs are received, various optimizers may be run over the inputs to determine the various cost benefits of selecting a particular host vehicle. For example, the road segment fuel consumption and segment trip time benefits may be analyzed (178). As another example, the quality of the prospective host may be evaluated (e.g., based on mpg, the remained of the trip, time, etc.) (180). As another example, the current potential host may be compared to other available hosts (182). Based on the determined costs and benefits, a host may be selected (184).

5). An algorithm based on elimination of candidate hosts may be used. For example, a potential host may be detected and eliminated from consideration for various reasons, including: the host vehicle being oversized, detecting a placarding/hazmat designation of the host vehicle, identifying of a disfavored vehicle (e.g., selected parameters such as government vehicle, school bus, uninsured or high risk vehicle, etc., may cause a potential host vehicle to be disfavored). Other factors may also cause a potential host to be eliminated from consideration.

Returning to process 100 of FIG. 3a, at step 104, the system may transition into an automatic or manual mode of operation. This may be based on one or more of the following factors: traffic conditions (e.g., if there is low traffic use automatic state, if there is high traffic use manual state), current cruise state (e.g., if cruise control is active then use automatic, if cruise control is not active then use manual state), proximity to host vehicle, a type of host vehicle, etc.

When the automatic mode is active, the system can control the vehicle into a tandem position (step 106). Such automated vehicle control can be implemented with radar system such as VORAD® or other suitable system (step 108). For example, the system may generate cruise control commands to regulate the speed of the vehicle. When the manual mode is active, the system can provide signals through the I/O system (e.g., input/output interface modules 29 and 39) to the driver in order to notify the driver of the identification of the host vehicle (step 110). The system can further provide dashboard signals (step 112) to the driver to assist the driver in controlling the vehicle into a tandem position. Such signals may include information related to the host vehicle (e.g., speed, direction, destination, etc.) and directional/speed guidance on how the driver should control the vehicle to assume/maintain the tandem position.

Figure 4:
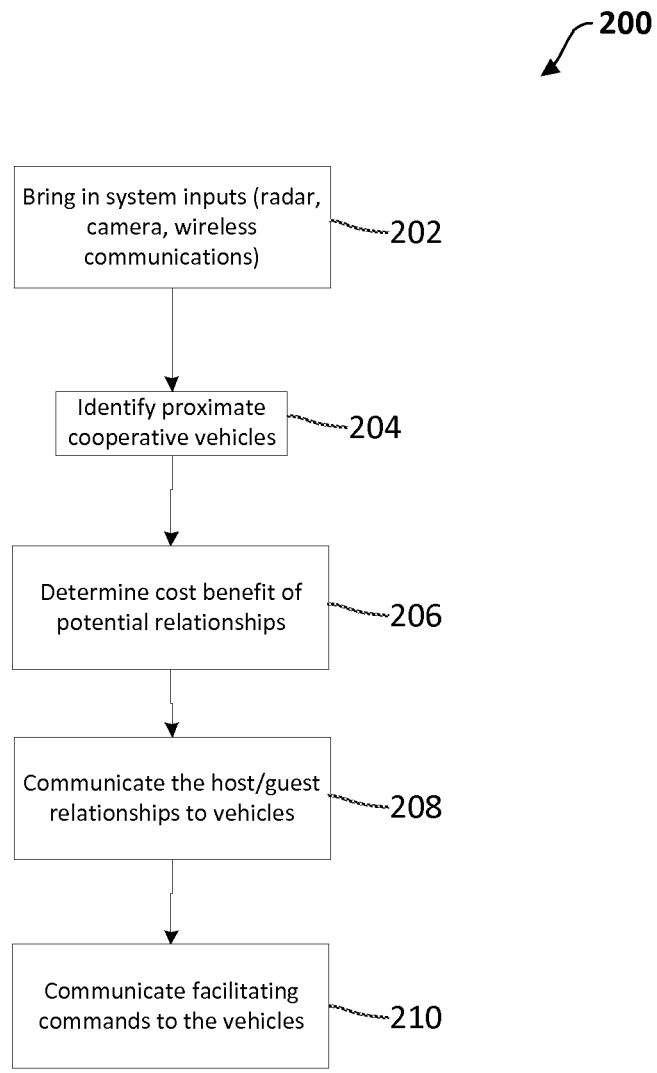
FIG. 4 is a flow diagram for a "network based" embodiment of the invention.

FIG. 4 shows a method 200 for a "cooperative" network based implementation of the present teachings, according to one embodiment. At step 202, system inputs are received from any combination of a variety of sources. For example, such sources may include smartphones, tablets, embedded electronics, cameras, radar, and/or wireless communication devices.

Based on the inputs, at step 204, proximate vehicles are identified for cooperative tandem driving. In one embodiment, nearby vehicles are identified from an online application that has access to vehicle location information (e.g., a database of vehicle locations, a GPS positing service for vehicles, etc.). For example, the following is a set of operations that may be implemented at step 204 in accordance with an embodiment:

Recognize nearby vehicles from a database of vehicle locations:
   For example, using peer-to-peer communication of location (e.g., through a tablet or smartphone); or
   as another example, using an online application that has vehicle locations accessible to it;
Recognize similar position and destination (or shared route for a significant period);
Receive target speed data and determine similarity;
Determine weight or truck class similarity via user or vehicular input;
Determine power/weight ratio similarity via user or vehicular input (particularly where hills or grades are determined to be important factors);
Determine similar remaining runtime period via user or vehicular input;
Determine similar online/offline status (or return to runtime status) via user or vehicular input;
Determine similar hazmat or load type information, which can affect routing, via user or vehicular input;
Determine current fuel level of the vehicles via user or vehicular input;
Determine if membership class of the potential co-operators is compatible (e.g., a gold status member near a normal status member that can serve as host) via a pre-registration process;
Determine fuel status compatibility via user or vehicular input;
Recognize post-relationship fuel savings in determining compatibility;
Recognize that a planned stop or other route adjustment can enable a relationship;
Consider speculative information (e.g., willing to increase speed within a range, willing to host, looking for a host, road type preferences, distance between stop preferences, average fueling range, etc.);
Account for credit exchanges (e.g., will host for a credit, will pay credits for a host, etc.); and/or
Account for route flexibility (e.g., if a normal exit is 106, but exit 121 is also compatible with route if that will enable a relationship).

In some embodiments, step 204 of identifying the proximity of potential cooperative vehicles includes the recognition of a nearby vehicle from a database using tablets, or smartphones equipped with GPS, or other position sensing technology. These devices may communicate position to a central database via a cellular or Wi-Fi network or, as an alternative, may communicate with each other directly using Bluetooth, cellular, or other communication technology. In the latter case, the computational algorithms discussed herein may be stored on and executed by devices, as opposed to a central server. However, in an alternative embodiment, an online application can be programmed to receive the locations of the vehicles and make the determination of proximate cooperative vehicles. In any case, recognition of present geography, destination, target speed, preferences, weight or truck class similarity, power/weight similarity, online/offline current operational status, hazmat and/or other information may be used in making the determination. For example, a brief stop or different route by one of the vehicles can be recognized as affecting the determination of a cooperative vehicle relationship. As another example, a membership class of the potential co-operators (e.g., normal/silver/gold, etc.) may be used in making the determination. As another example, a current fueling level of the vehicles may also be considered. As another example, speculative information about the vehicles could be considered, including the possibility that one might be willing to: increase speed (perhaps at a given cost function), be a host (for credits, etc.), looking for a host (for credits, etc.), engage in a bidding process as host and/or guest, etc. As another example, the system may also consider preferences (road type, speed, stop interval, upcoming stop, average fueling range, etc.). As another example, route flexibility might also be considered, including the length of time or distance that a vehicle can stay on particular highway despite initial plan to exit. As another example, a company policy (e.g., excluded areas or routes) may be considered. The system may decide to stay on a particular route longer if a relationship benefits outweigh costs of the change.

As an alternative to the above, registered users could couple for tandem drafting via an application coupled to the server (e.g., server 40 of FIG. 1). In this arrangement, the system may recognize and couple vehicles based on such inputs as: similar positions, destinations, and/or shared routes for a significant period of time.

In step 206 the cost benefit of potential relationships between vehicles are determined. For example, one or more operations at step 206 may be performed, including:

Determining cost in terms of fuel, $CO_2$ emissions, other emissions (e.g., $NO_R$, particulate matter (PM), etc.)

Determining route time gain due to the potential matchup (e.g., if greater speed at a fixed fuel economy is realizable)

Determining a risk tolerance profile of the individuals (e.g., if the cost of speed is greater than fuel increase only)

Determining cost premiums or other violations of the normal cost relationship (e.g., if one party is on a prioritized trip and willing to increase costs)

Determining operational costs to engage the relationship may be considered (e.g., a cost of a 15-minute wait, or a different routing that increases overall distance traveled)

Determining whether costs can be shared outside the moving vehicle system (e.g., through external exchange of credits) and allowing the system to be moved toward the overall optimal even if that involves, e.g., only one of the vehicles playing host all the time. Otherwise a "fairness" value can be an externality that imposes a cost on the system Determining an uncertainty values attached to cost/benefit estimates (e.g., through Monte Carlo analysis or other statistical treatments)

At step 208, the optimal host/guest relationships are communicated to the drivers/vehicles. In one embodiment, step 208 of communicating the optimal relationships determined may be implemented via the use of a web-based or other application that can provide coupling information to the vehicles. Alternatively, on-vehicle systems ay perform the communication, handshake, etc.

At step 210, operational parameters to facilitate the relationships (e.g., to form a drafting/tandem relationship) are communicated to the drivers/vehicles. Exemplary parameters that may be provided include Vehicle speed, lane, route instructions/vectors that may be used to guide vehicles into the same region;

Speed and following distances that may be used in forming the match (e.g., used to ensure cost/benefits are realized); and/or A vehicle order or vehicle order trajectory In any of the operations discussed herein, real-time information may be used to adjust relationships and/or to transfer costs outside the moving vehicle system. This real-time information may include real time updates related to what is happening as vehicles are forming relationships. This can be used to augment the expected behavior of the vehicles (e.g., prior to the establishment of tandem relationship). This also allows an established relationship to be dynamically adjusted. For example, a relationship may be adjusted to accommodate unexpected effects in the environment, vehicles, and/or operators, etc.

An example of the application of the discussed network based method is set forth below. The example describes 5 vehicles that are in a certain geographic region, which may be determined from network based information. Inputs to the system, processing performed by the system, and outputs from the system are described:

Inputs
    Current locations (e.g., starting locations)
    Destinations
    A fuel usage function
    A tandem pairing fuel usage function (according to each potential pair, e.g., AB, AC, AD, AE for vehicle A, etc.)
    Boundary conditions and limits (e.g., delivery deadlines, top speeds, required stops)

Processing
1. Determine system cost without any adjustments (e.g., a system cost may include fuel usage, delivery times, emissions, etc.). For the purposes of this example, let's assume fuel usage.
2. Determine system cost for each pairing possibility. Multiple combinations involcing different vehicles (e.g., AB and DC) may be analyzed at the same time)
3. Multi-vehicle groupings may be considered (e.g., ABD).
4. Where a lower cost solution is found, the solution can be communicated to the vehicles or controllers.

Outputs
1. Potential output, which can be communicated to display the identity of matching vehicle and driving directions to intersect routes.
2. Adjustments to cruise control, vehicle speed, following distances (e.g., with an automated radar system, etc.), instructions to stop (e.g., 15 minute wait at a rest stop in order to enable the pairing, etc.).
3. Re-routing of deliveries (e.g., drop second package off before first to enable routing)
    a. This may be based on geography or in other dimensions—e.g., the drop weight on a vehicle so that both vehicles have similar power/weight ratios for a difficult portion of the trip, etc.

A second example of the application of the discussed network based method is set forth below. The second example describes two vehicles that have entered the same geography, which may be used a web subscription service to coordinate a pairing. Inputs to the system, processing performed by the system, and outputs from the system are described:

Inputs
    Current locations (starting locations for the purposes of this algorithm)
    Destinations
    A fuel usage function
    A tandem pairing fuel usage function (e.g., with each pair, AB, BA, and shared hosting)
    Boundary conditions and limits (e.g., delivery deadlines, top speeds, required stops)
    Subscription type and options (e.g., willing to host, willing to guest, cost transfer information)

Processing
1) Determine system cost without any adjustments
2) Search the operating space for cost savings which may include optimizations. A subscription option can affect the cost determination—for example, although fuel cost alone would dictate one outcome, voluntary cost exchange between the parties may determine an alternative outcome.

3) Communicate solution to the vehicles or controllers involved.

Outputs

Vehicle pairing and routing commands to engage and disengage tandem relationships at the appropriate time.

Credit transfers in the context of the subscription service.

Those skilled in the art will recognize additional applications and embodiments are within the scope of the present teachings. Hence, the invention is not limited to the examples, applications, and embodiments disclosed herein.

Figure 5:
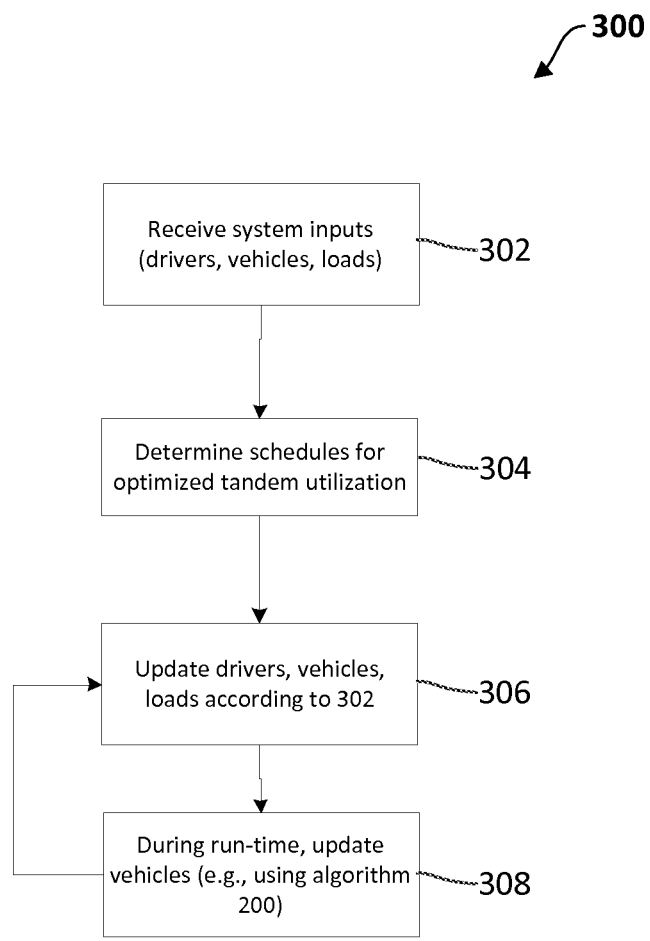
FIG. 5 is a flow diagram for a "fleet based" embodiment of the invention.

FIG. 5 depicts a flow diagram 300 for a "fleet based" embodiment. In this embodiment, the system (e.g., system 10 of FIG. 1) determines optimal schedules and/or routes in order to facilitate optimized tandem matchups and associated costs. The optimal schedules and/or routes may be optimized with respect to one or more of a number of key parameters. For example, optimal tandem matchups can be based on target speed, fuel economy, fleet preferences, company policy, regulatory constraints, and a variety of other factors as discussed more fully below. Accordingly, at step 302, system inputs regarding drivers, vehicles, and loads are received to determine schedules for optimizing tandem utilization. The step of inputting vehicles, drivers, and load information may be constrained by a geographical constraint (e.g., a state, tri-state area, etc.), time based constraint (e.g., this week, this month, etc.), or a subset of the entire fleet. This step can be implemented as a real-time, continuous, and/or discrete operation.

As an example, the vehicle information may include the following data: power/weight information, loading limits, current fuel information, fuel capacity, fuel economy (or fuel economy function), upcoming/required maintenance, operational constraints (e.g., time needed to regenerate after-treatment measures, hazmat routing, etc.), reliability/breakdown statistics, current location information, nominal schedule/start-time (which may interact with load information), flexibility to schedule/start-time, current load(s) on the vehicle.

As an example, the driver may include the following data: driver hours utilized/remaining, driver fuel economy performance, driver preferences, driver risk profiles. Driver information may also be grouped, averaged, or otherwise combined for paired drivers.

As an example, the load information may include the following data: loading weight information, loading volume, pickup information, destination, flexibility state (e.g., may specify if a specific vehicle is required, already loaded, etc.), load special requirements (e.g., if power, refrigeration, a flat bed, etc., are required), delivery time (e.g., optional, required, cost as a function of time, etc.).

At step 304, the schedules are determined. To determine the schedules for optimized tandem utilization, cost/benefit functions may be analyzed with regard to any selected criteria, and such cost functions can then be tailored according to the selected information. Optimal or incremental changes that provide an improvement can then be determined. Costs may be analyzed with respected to various metrics, including: maintenance costs, driver satisfaction costs, risk, fuel costs, $CO_2$ emission costs, time of deliveries, increases or decreases of an uncertainty factor, etc.

At step 306, the drivers, vehicles, and loads are provided with the schedules determined in step 304. This step may be repeated as necessary during runtime as depicted in step 308. In updating schedules, a load distribution may also be changed between vehicles or a load delivery order may be changed (e.g., to provide two vehicles with an extended shared path, etc.). A route assignment (e.g., a planned path or optimal path for a single vehicle that is sub-optimal for two or more vehicles that is combined and changed) could be changed as part of a schedule update as well. Other schedule updates may include: setting of bifurcation/separation points for two or more tandem vehicles, setting of vehicle teams, team order, team speeds (e.g., may be a trajectory of one or more of these), following distances, or scheduling a truck for convoy matching from different sites (e.g., instructions to leave 10 minutes later in order to have a shared route with another truck at a later point in the route).

First Execution Cycle Example

An example of a first execution cycle for fleet management operations (e.g., for an entire fleet) is provided. Inputs to the system, processing performed by the system, and outputs from the system are described:

Inputs

Current locations (a starting location for the purposes of this algorithm)

Destination(s)/loads

Load flexibility (where vehicles are to be loaded, placards, any load management required by load)

A fuel usage function, maintenance schedules, driver hour logs, emissions schedules, load switching cost functions, delivery time cost functions Normalization schedule for any of the input cost functions (e.g., all may be converted to dollars, arbitrary units, etc.)

Tandem pairing fuel usage functions (e.g., for each pair: AB, AC, AD, AE corresponding to vehicle A, etc.)

Facility availability information (for maintenance, fueling, load switching, etc.)

Boundary conditions and limits (e.g., delivery deadlines, top speeds, required stops)

Processing

1) Determine system cost without any adjustment
2) Search the operating space for cost savings opportunities. It is unlikely that an optimum can be found within the entire operating space of vehicles with six cost functions. The algorithm may search through the space intelligently. For example, the algorithm may search by:
   a. grouping vehicles that have similar starting locations or destinations, similar power/weight ratios (e.g., starting with similar power vehicles)
   b. Certain types of costs can be improved by looking at inefficient loads first—loads or routes that have unusually high emissions, maintenance, or delivery costs and evaluate those for tandem improvements first)
   c. Load switching can be utilized to limit driver costs (e.g., drop a last load with a nearby vehicle that is going to be near the delivery point, allowing a driver to stay under the 10-hour limit) and/or limit the number of vehicles that have to driver certain route portions
   d. Focusing on cost features that require earlier implementation first (e.g., vehicle loadouts) and features that can be implemented later at a later time (e.g., routing of final destinations) unless computing resources and time supported full optimization before
3) Could check for multi-vehicle groupings (e.g., ABD) if time and computing resources allow.
4) Where a lower cost solution is found, communicate solution to the vehicles or controllers involved Outputs (One or More)
 Outputs can include vehicle pairing, driver assignment, and load pairing. As a practical matter, driver assignment would generally not be open ended, but limited to where a shift would yield significant benefit (e.g., a 10-hour driver may yield significant cost saving on a route that was going to have a 6-hour driver assigned).

Second Execution Cycle Example

Figure 6:
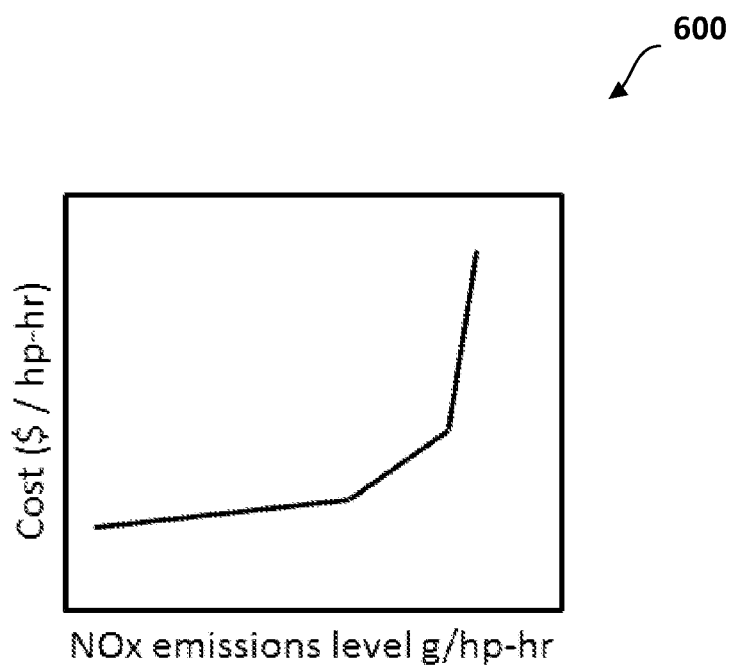
FIG. 6 is an illustrative graph of $NO_x$ emissions versus costs.

A second execution cycle example for a logistics manager (e.g., logistics manager 72 of FIG. 2) for fleet management operations is provided:
1) Input facility information:
   a. Facility index
   b. Hours of operation
   c. Service types available (maintenance operations, loading/unloading operations, etc.)
   d. Cost function to violate hours of operation (e.g., 3 AM load change, etc.)
   e. Cost description for normal operations (could be a function of time of day, type of vehicle, etc.)
2) Input driver information:
   a. Driver license type (e.g., Hazmat, oilfield/special hours license, etc.)
   b. Driver time log data (hours used today—on duty and driving, hours used in longer term tracking period, hours criteria for contract or other agreement purposes, hours cost where applicable from, e.g., a company risk model or an agreement such as overtime) c. Driver vehicle matching data (which vehicle or vehicles is driver matchable with, cost function if applicable as some driver-vehicle matches may incur a cost)
   c. Driver experience information (could be time of service, route type—grades, heavy traffic, urban environment, etc.)
3) Input vehicle information:
   a. Vehicle performance data—torque curve, fuel economy performance, exhaust temperature performance, current state of the after treatment system (e.g., $NH_3$ storage level, soot storage level, # of regenerations performed, time to next regeneration, catalyst age factors), after treatment system requirements (operating temperatures, flow rates, regeneration cycle time, distance, or other regeneration frequency criteria), vehicle rolling resistance and aerodynamic resistance values or functions
   b. Vehicle maintenance data—maintenance events required (timing, frequency, event type), current state of maintenance systems
   c. Vehicle load data—load capacity in volume, weight, and/or per axle limitations, load types available (box, flat bed, refrigerated, liquid storage, food grade liquid storage, flammable capable liquid storage, placard locations and types available)
   d. Facility compatibility—special loading/unloading facilities required, special maintenance facilities required, fluid types [e.g., DEF (diesel exhaust fuel), fuel, fluids] required, cost functions for any off-nominal facilities
4) Input route and load information:
   a. Current locations of all contemplated loads
      i. Geographic location
      ii. Logistical location (e.g., on vehicle, at loading dock, etc.)
   b. Destinations of all contemplated loads and route/terrain information in between
      i. Individual to the load, or
      ii. Considered with the loads of a group on a vehicle. Load delivery order may be a controllable parameter for the optimizing function or it may be a fixed value.
   c. Special requirements for the load
      i. Load placarding/hazmat information
      ii. Load delivery requirements—hard delivery time limit, delivery time cost function, etc.
      iii. Load storage and handling requirements
      iv. Loading/unloading and switching cost functions—could be a function of the load type, vehicle-facility interaction, and current load location on the vehicle. All of these are quantifiable where the data is desired and available.
5) Input Costs
   a. Cost of fuel into nominal units (e.g., dollars)
   b. Cost of maintenance into nominal units (e.g., 1 unit of wear on catalyst=$3.75, where a time-temperature curve function provides wear units as an output, additionally a regeneration event may be a set number of wear units; 1 truck mile=$0.80+$0.005*truck weight in tons, etc.)
      i. The functions provided are provided as an example, and may be calculated readily by a fleet owner or other person of skill in the art having the benefit of the present disclosure. The scope of the present application is not limited to the above cost functions.
      ii. Could be calculated by estimating the time of wear events themselves—e.g., 50,000 mile oil change at $250 gives a specific cost per mile of oil maintenance, engine rebuild at 750,000 miles gives a specific engine rebuild cost, etc.)
   c. Cost of wear and tear in nominal units
   d. Cost of emissions in nominal units
      i. e.g., 1 gram of NOx=$3, etc.
      ii. Emissions criteria to rate on cost may include: 1) sulfur (calculated by fuel usage and oil consumption, affected by time spent at very high loads and by total fuel consumption); 2) soot; 3) carbon dioxide; 4) NOx; 5) $NH_3$. All of these can be modeled or estimated under various known techniques, and a given embodiment may use one or several of these.
      iii. Possible factors affecting the emissions cost—overall engine program or fleet emissions strategy (e.g., some engine programs may want to come in under regulatory levels in order to provide credit to other programs); agreements with suppliers, clients, or internal programs to meet certain emissions levels; public relations plans to meet certain emissions levels
      iv. Emissions cost may be non-linear, for example having a certain rate or fixed cost below a specific level, and rapidly increasing above that level, such as in graph 600 that is depicted in FIG. 6. FIG. 6 provides only one view of an emissions cost scheme. Numerous other potential emissions relationships could be used without departing from the scope of the present teachings.
   e. Other cost functions—safety cost (e.g., cost function for driver hours over time, drivers have peak safety after a few hours and then decline, so tandem planning to maximize safe driving hours may net lower cost); net load delivery time cost (e.g., arrival times of loads in the aggregate will vary with the tandem operations, and affect the optimal tandem operation points); other risk costs (e.g., net miles traveled with hazardous loads in populated areas can be quantified and costed out, dangerous intersections can be mapped and risk quantified where tandem operations affect the number of vehicle interactions with those intersections and thus the net cost).

Referring to FIG. 6, the example graph 600 of emissions costs including $NO_x$ output levels is shown. In some embodiments, the graph could be extrapolated, or the costs may go to infinity (e.g., at a Not to Exceed (NTE) level where operation is disallowed, etc.). Any of the cost functions may be contextual, for example: urban versus rural operation, dependent on performance versus a running average (e.g., where we are well below the average, the cost may be allowed to decrease slightly until we approach the average again), set aside or modified at certain altitudes or ambient temperatures, etc. One of ordinary skill in the art typically knows their business drivers, regulatory environment, and emissions strategies, and may be able to generate a sensible emissions cost scheme for their fleet or engine platform having the benefit of these disclosures.

Any or all of the cost functions may be utilized in an embodiment, and they may vary from vehicle to vehicle or driver to driver. Where mixed costs are compared, they can be normalized, such as into dollars or arbitrary cost units. Where costs are in the same units, they can be compared directly (e.g., vehicle—intersection interactions could be a cost unit). The factors that are used in the final cost analysis may be changed in real time by the fleet operator, they may be predefined, or the fleet operator may define several different cost factors as scenarios and compare the final results.

Continuing with the Second Execution Cycle Example:

6) Input limit information. It should be understood that the information provided in this section may be applicable in any of the other sections and example. This section represents limit or boundary condition information that shall not be violated in the models. This may have been provided through other information pieces (e.g., such as driver rules/limits being input with the driver information) and may be implemented instead by a cost function (e.g., such as a cost going to infinity or zero at a boundary condition, etc.).
   a. Regulatory information such as: load handling requirements (e.g., load must travel in hazmat areas only), trucks not registered to be in certain areas or states, drivers not licensed for certain load types, emissions requirements that cannot be exceeded, etc. In some embodiments, these may be hard limits for the model to prevent outputs running into these parameters.
   b. Load handling information, load refrigeration requirements, and load facility requirements (forklift, dock type, etc.).
   c. Driver rules and hour limits (e.g., any requirements from the fleet, etc.)
   d. Fleet rules. Any fleet rules not otherwise covered previously, such as geographic limitations, speed limits, engine operation limits (torque, acceleration, etc.), required stops, maximum time on the road, time of operation. Any fleet rules can be a function of the driver, vehicle, load or load type, geography, time of day, time of year, etc.

7) Determine nominal cost of the system.
   a. Model all of the vehicles with the nominal planned inputs—where loads, vehicles, and drivers are already expected to go.
   b. Operate the selected cost functions on the nominal system model and determine the overall system cost.
8) Determine the scenario space to check. Below are two examples, however, the present teachings are not limited thereto:

Each planned vehicle route (i.e. fleet-wide routes) can be divided into granular increments (e.g., 100 yards) and then each potential grouping of vehicles (including groups of two through some predefined convoy limit—three, four, five, six, etc.) can be tested along each increment of the routes. Certain implausible scenarios may be excluded from testing (e.g., testing for a tandem route for an east bound and a west bound vehicle). Scenario hits that improve the cost function from the nominal cost function are recorded (hereinafter, the "FIRST RESULT SET"). All vehicle routes may be cycled through to see if any intermediate routes are on permissible roads that are "between" two or more vehicle route. These intermediate routes can be divided in into granular increments, and test each potential grouping of vehicles along each increment of the routes of all other vehicles and along the intermediate routes. Any scenario hits that improve the cost function from the nominal cost function can be recorded (referred, the "SECOND RESULT SET"). The top results (e.g., 10% of the improved route lists) are taken from the FIRST and SECOND RESULT SETS and are tested for convergence (e.g., standard convergence analysis may be utilized, such as improvement below a threshold increment, etc.).

Where convergence is indicated, one of the best results may be published as the new tandem driving plan (e.g., may be the best result, or a result within a % value of the best result that implements the least change from the current plan, etc.). Publication of a result may occur only in the circumstance where the improvement is above a threshold value—the threshold value for published improvement could be system-wide, or it could be vehicle specific. For example, a 3% cost improvement to the overall system might trigger a publication event, or a 3% cost improvement for any vehicle might trigger a partial publication event that provides only a pair of vehicles instructions, but there is not enough system benefit to alter other aspects of the system. The 3% is a guideline, and the present disclosure is not limited to a certain threshold. The system-wide and vehicle specific thresholds to publish might also be distinct values.

Where convergence is not indicated, one of the best results may still be published, however the route plan may be checked again with one of the tandem plans being utilized as the new nominal plan. A published result may only have a low-change that is close to an optimal plan. Accordingly, a plan may be published and iterated as it is checked again.

After a period of time, real-time data can be utilized to update the present state of the system and the current nominal plan (which may have changed due to traffic delays or any other real life variables). The optimization procedure can then be repeated with the current nominal plan.

A second example includes checking the system for route similarities for vehicles. These may be space-time similarities that put vehicles in the general geographic vicinity, and these can be quantified by looking at a distance plot between any pair or group of vehicles in the system over time. The system may automatically time shift each vehicle a few minutes forward and backward (e.g., in 1-minute increments up to 15-minutes each way, etc.) in order to check for similar routing that would be missed due to a time lag effect that is not apparent in a raw distance plot. Other time shifts may also be used.

Where a route similarity appears in the data that extends for any specified length of time (e.g., they are within 5 miles or less for 5 minutes or more), those vehicle routes can be granularized and tested for tandem cost saving possibilities. The cost function for that vehicle pair or group can then be checked for convergence, sufficient improvement, etc., and publication occurs similarly to that described for the fleet-wide case above.

Continuing with the Second Execution Cycle Example:

9) Publication
   a. The operations described as publication above are the outputs to the vehicles/driver. These outputs allow the vehicles/drivers to perform the operations to implement forming a tandem relationship. These outputs may include driver instructions (e.g., wait 10 minutes at the rest stop, then get back on the road; switch to highway 53; leave 1 hour later tomorrow morning; pick up this load and change your route to the following, etc.) and/or vehicle commands (e.g., adjust cruise control speed, increase top speed by a certain MPH until the other vehicle is reached, increase max torque limit and travel over the mountains with the other vehicle, increase exhaust temperature and regenerate soot filter while another vehicle is getting close to begin a tandem driving section, etc.)
   b. The operations published to the vehicle can be provided through wireless commands to the ECU or output to a device (dashboard display, iPhone, etc.). Additionally, a display of a fleet system may be used. In this manner, a fleet operator can call operations in to a driver, or a warehouse operator can be provided a command to load or unload a certain load from a trailer that is going to be picked up in the morning, etc.

10) Iteration
   a. Any of the operations described can iterate after publication, after a time period has passed, after a certain amount of system change has occurred (e.g., a certain number of ton-miles have moved), according to a schedule, etc. For example, the system can be operated continuously, on an ad-hoc basis (e.g., checking pairs of vehicles throughout the system, etc.), or nightly/monthly for overall fleet planning.

Other consideration may be made with respect to any of the functionality disclosed herein. For example vehicle order/configuration may be static or dynamic. A static configuration may set a relative position and velocities as a constant or (in general) a pre-defined value prior to path execution from that point onward. A dynamic configuration may change the system configuration based on active route, environment, vehicle, etc. conditions. Both static and dynamic configurations may apply to either "parasitic" or "cooperative" tandem driving implementations.

Vehicles may dynamically issue commands in order to shift order/sequence. Such commands may be issued based on optimizing system thermal management, optimizing an extended hill climb or decent, available fuel in tank, weather conditions/changes. For example weather conditions may dictate that road conditions would be more stable if vehicle A were ahead of vehicle B, even though this may be a lower fuel efficient solution Any of the commands described herein may include outputs in the form of: output to Telematic displays, output required to override control of a cruise set speed, output required for tactile interface with operator. Additionally, any of the commands/output described herein may be generated based on key environmental/systemic inputs. Such inputs may include, but are not limited to, the inputs described in the following list:
   a. Distance
   b. Road Type (2-Lane, 4-Lane, Limited Access)
   c. Road Condition (Surface)
   d. Road Construction Activity
   e. Qty of Stop Signs/Lights
   f. Topography (Road grade)—multiple route options
   g. Topology (Road Node Analysis)
   h. Weather (Wind, Temp, Precipitation, etc.)
   i. Time-of-Year
   j. Time-of-Day
   k. Day-of-Week
   l. Holidays (By Country)
   m. Local Activities/Events
   n. Weight of Vehicle
   o. Accident History/Dangerous Intersections
   p. Traffic Conditions (Broadcast)
   q. Driver ID/History/Preference
   r. Speeding Ticket History (Route)
   s. Class 8 Inspection History (Route)
   t. Weigh Station Locations??
   u. Access to Fuel (viable source)
   v. Total Fueling Costs (Neg. Rates, Surcharges, VAT, etc.)
   w. Fuel Type (Viable Source)
   x. Access to Service
   y. Access to Rest Area/Sleeping Location
   z. DOT Driving Time Restrictions (Driver Status)—By vehicle type/application
   aa. Multi-Driver Vehicles
   bb. Convoy/Tandem Vehicle Options
   cc. Haz Mat
   dd. Fleet Preferences (Fixed Input Constraints)
   ee. Driver Inputs (Control Levers/DOF)
   ff. Powertrain/Vehicle Specs (include safety limits)
   gg. Powertrain DOF
   hh. Access to load broker (Owner Operator)
   ii. Cost function (performance metric)
   jj. Freight delivery constraints to destinations
   kk. velocity (time, distance, . . . )
   ll. gear (time, distance, . . . )
   mm. governor set speed (time, distance, . . . )
   nn. destination order (time distance, . . . )
   oo. freight/cargo changes (time, distance, . . . )
   pp. fuel loading (time, distance, . . . )
   qq. income/profit (time, distance, . . . )
   rr. service event (time, distance, . . . )
   ss. route (time, distance, . . . )

As will be appreciated by those of ordinary skill in the art, the methods depicted in the flow diagrams of the present disclosure may be implemented by hardware and/or as computer instructions on non-transient computer readable storage media, and functions may be distributed across various hardware or computer based components. Examples of computer-readable media include but are not limited to recordable type media such as volatile and non-volatile memory devices, floppy and other removable disks, hard disk drives, optical disks, flash memory, among others. Such instructions may be executed by a processor (e.g., a general-purpose processor, an application specific integrated circuit (ASIC), one or more field programmable gate arrays (FPGAs), a digital-signal-processor (DSP), an engine control unit (ECU), a group of processing components, other suitable electronic processing components or modules, any commercially available processor, etc.).

One advantage of the present invention is that it provides systems and methods for improving vehicular fuel performance by coordinating the movement of vehicles to optimize the cost and/or performance of key functions and parameters with respect to a host vehicle or a fleet of vehicles. In addition, an audio channel may be provided between the vehicles using the transceivers 22, 32 and/or 42 to allow grouping based on a verbal exchange of desire and/or compatibility.

Reference in this specification to "one embodiment" or "an embodiment" means that a particular feature, structure, or characteristic described in connection with the embodiment is included in at least one embodiment. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

While certain exemplary embodiments have been described and shown in the accompanying drawings, it is to be understood that such embodiments are merely illustrative and not restrictive of the disclosed embodiments and that these embodiments are not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

What is claimed is:

1. An apparatus comprising:
    a logistics manager comprising a processor, wherein the logistics manager is communicably coupled to at least one of a first wireless communication module onboard a first vehicle and a second wireless communication module onboard a second vehicle, and wherein the logistics manager is configured to:
        receive, via the first wireless communication module, first data regarding the first vehicle, wherein the first data is provided by a first sensor module onboard the first vehicle;
        receive, via the second wireless communication module, second data regarding the second vehicle, wherein the second data is provided by a second sensor module onboard the second vehicle; and
        provide navigational commands to at least one of the first vehicle and the second vehicle based on a cost and benefit analysis in response to at least one the first data and the second data.

2. The apparatus of claim 1, wherein the logistics manager is communicably coupled to the first vehicle and the second vehicle via a public network.

3. The apparatus of claim 2, wherein the public network comprises the World Wide Web.

4. The apparatus of claim 1, wherein the logistics manager is communicably coupled to the first vehicle and the second vehicle via a private network.

5. The apparatus of claim 1, wherein the first data and the second data comprises destination data related to the first vehicle and the second vehicle, and wherein the cost and benefit analysis is based on the destination data.

6. The apparatus of claim 1, wherein the first data and the second data comprises proximity data related to a proximity between the first vehicle and the second vehicle, and wherein the cost and benefit analysis is based on the proximity data.

7. The apparatus of claim 1, wherein the first data and the second data comprises vehicle size data related to the first vehicle and the second vehicle, and wherein the cost and benefit analysis is based on the vehicle size data.

8. The apparatus of claim 1, wherein the first data and the second data comprises vehicle type data the first vehicle and the second vehicle, and wherein the cost and benefit analysis is based on the vehicle type data.

9. The apparatus of claim 1, wherein the first data and the second data comprises vehicle weight data related the first vehicle and the second vehicle, and wherein the cost and benefit analysis is based on the vehicle weight data.

10. The apparatus of claim 1, wherein the first data and the second data comprises vehicle class type data related the first vehicle and the second vehicle, and wherein the cost and benefit analysis is based on a vehicle class type similarity.

11. The apparatus of claim 1, wherein at least one of the first wireless communication module and the second wireless communication module comprises a tablet or smartphone.

* * * * *